United States Patent [19]
McGovern et al.

[11] Patent Number: 4,953,517
[45] Date of Patent: Sep. 4, 1990

[54] TORSION DAMPING MECHANISM FOR A SUPERCHARGER

[75] Inventors: Kevin M. McGovern, Dearborn Heights; Robert C. Schoenhals, Davisburg, both of Mich.

[73] Assignee: Eaton Corporation, Cleveland, Ohio

[21] Appl. No.: 339,332

[22] Filed: Apr. 14, 1989

[51] Int. Cl.⁵ .............................................. F02B 33/38
[52] U.S. Cl. ................................ 123/559.1; 418/206; 464/57; 464/62; 464/66; 464/77; 464/100
[58] Field of Search .................... 123/559.1; 418/206; 464/57, 62, 66, 77, 100, 101, 71

[56] References Cited

U.S. PATENT DOCUMENTS

| | | | |
|---|---|---|---|
| 1,518,360 | 12/1924 | Royce | 464/46 |
| 2,115,819 | 5/1938 | Lewis | 192/68 |
| 2,963,006 | 12/1960 | Karde | 123/41.33 |
| 2,989,857 | 6/1961 | Helland et al. | 64/11 |
| 3,002,594 | 10/1961 | Haseler | 464/57 |
| 3,195,324 | 7/1965 | Sellwood et al. | 64/14 |
| 3,226,579 | 12/1965 | Bygdnes | 464/71 |
| 3,236,066 | 2/1966 | Fredrickson | 464/77 |
| 4,171,627 | 10/1979 | Fukuda | 64/15 |
| 4,212,380 | 7/1980 | Billet | 192/106.2 |
| 4,327,563 | 5/1982 | Allmacher | 464/100 |
| 4,564,345 | 1/1986 | Mueller | 418/206 |
| 4,638,570 | 1/1987 | Soeters | 33/562 |

FOREIGN PATENT DOCUMENTS

| | | | |
|---|---|---|---|
| 285573 | 1/1953 | Switzerland | 123/559.1 |
| 556209 | 9/1943 | United Kingdom | 60/624 |

*Primary Examiner*—Douglas Hart
*Attorney, Agent, or Firm*—P. S. Rulon

[57] ABSTRACT

An intake manifold (18) for an engine (10) includes a Roots-type supercharger (26) having a torsion damping mechanism (54) for reducing audible gear tooth rattle of timing gears (72,74) which prevent contact of meshed lobes (28c,29a) of the supercharger rotors (28,29). The damping mechanism includes a hard outer shell or band (102) for maintaining the shape of an annular member (100) formed of relatively soft elastomeric material which is fixed for rotation with the gear (74). The member (100) includes three arcuate slots (100c) each defining forward and reverse direction stops (100d,100e) for limiting movement of pins (96) slidably disposed at one end in the slots and fixed at the other end to the input shaft. A torsion spring (98) of low rate resiliently connects the pins to the annular member for reducing the audible gear tooth rattle. A set of three cantilever springs, molded integrally with the annular member, mitigate audible impacts of the reverse stops (100e) by the pins (96).

30 Claims, 3 Drawing Sheets

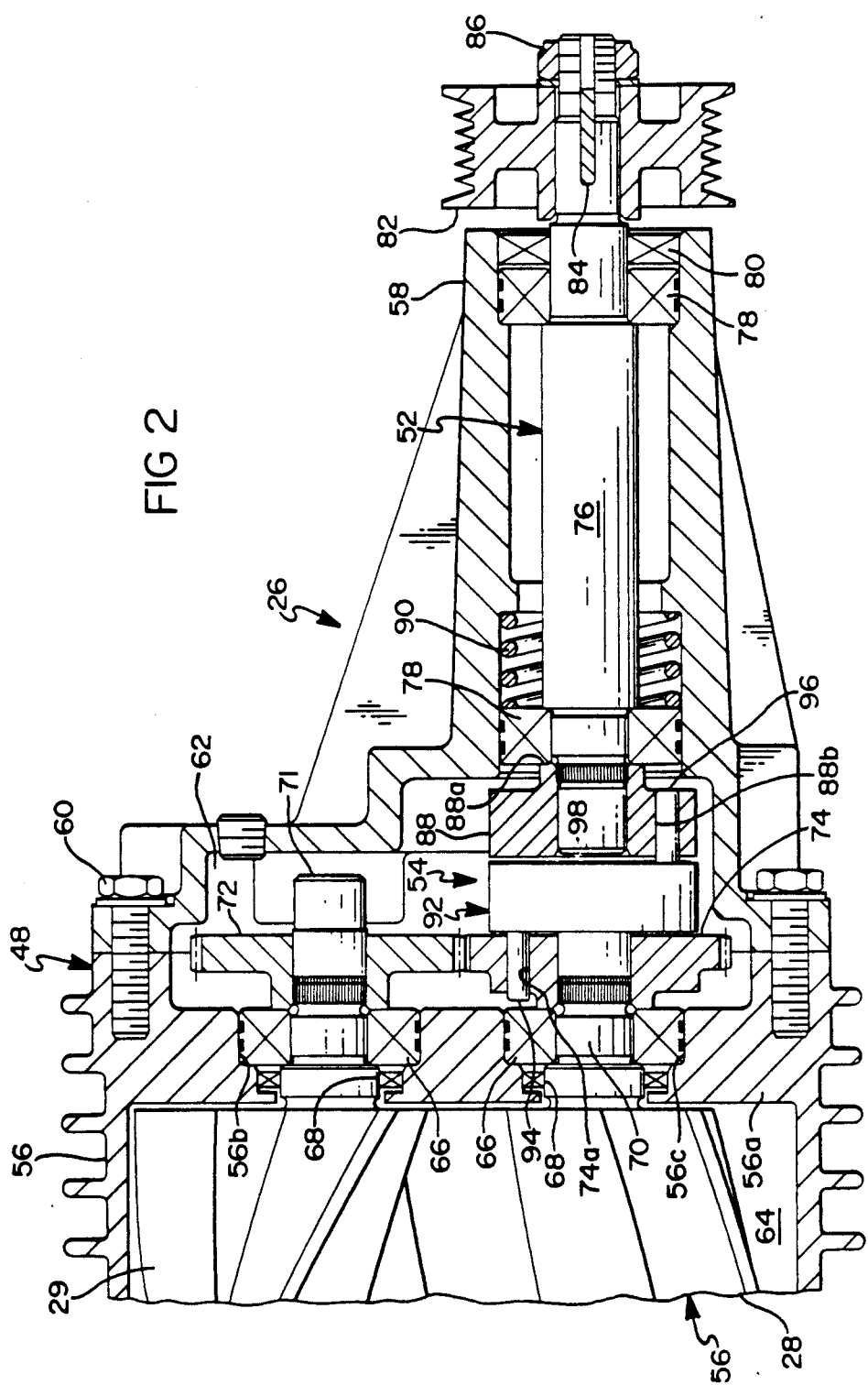

TORSION DAMPING MECHANISM FOR A SUPERCHARGER

CROSS REFERENCE TO RELATED APPLICATIONS

This application is related to U.S. application Ser. No. 200,330, filed May 31, 1988; No. 211,944, filed June 27, 1988, now U.S. Pat. No. 4,844,044, granted July 4, 1989; No. 339,333, filed Apr. 14, 1989; and No. 339,336, filed Apr. 14, 1989. These applications are assigned to the assignee of this application and are incorporated herein by reference.

FIELD OF THE INVENTION

This invention relates to a torsion damping mechanism. More specifically, the invention relates to a torsion damping mechanism for reducing audible noise of timing gears in a backflow-type supercharger driven by an internal combustion engine.

BACKGROUND OF THE INVENTION

Rotary blowers of the backflow-type, particularly Roots-type blowers, are characterized by noisy operation. Roots-type blower noise may be roughly classified into two groups: solid borne noise caused by clashing and clanging of components subjected to fluctuating loads, and fluid borne noise caused by fluid flow characteristics such as rapid changes in fluid velocity. The invention of this application is concerned with solid borne noise caused by timing gear rattle and with secondary noise caused by a spring damper.

The timing gears of the Roots-type blowers, such as the blower disclosed in U.S. Pat. No. 4,638,570, may produce an objectionable gear rattle when the meshed teeth of the gears are substantially unloaded. Such unloaded conditions occur during non-supercharging, low engine speed modes of operation. The gear rattle may be mitigated by a damper having a low torque transmitting capacity, low rate spring which is made flexibly operative only during such modes of operation by forward and reverse stops. However, objectionable secondary noise may be cause by impacts of the forward and reverse stops due to abrupt movement of the engine throttle and/or rough low speed engine operation, and by impacts of the reverse stop during engine shut-down.

SUMMARY OF THE INVENTION

An object of this invention is to provide a durable, low cost spring damper which negates objectional rattle noise produced by unloaded gears and which is free of objectionable secondary noise.

Another object of this invention is to provide a torsion damping mechanism which reduces timing gear rattle in a Roots-type blower driven by a periodic combustion engine and which damper prevents objectionable secondary noise during periods when the engine throttle is being abruptly moved, when the engine is being shut-down, and/or when engine is operating roughly at low speeds.

According to a feature of the invention, a torsion damping mechanism is adapted to be rotatably interposed between a first drive rotatably driven in a forward direction by a torque from a periodic combustion engine and a second drive for driving a first gear in constant mesh with a second gear.

The mechanism is characterized by annular means disposed for rotation about an axis and fixed to one of the drives, the annular means includes a plurality of circumferentially spaced apart and generally arcuate-shaped slots each having first and second ends respectively defining stops in the forward direction and in the reverse direction; axially extending pins each having one end loosely received by one of the slots and the other end fixed to the other drive; a first spring means for drivingly interconnecting the other drive and the annular means, and operative in a static state of the mechanism to position the pins closer to the second stops than to the first stops; and second spring means fixed at one end to the annular means and having a free end extending radially in cantilever fashion into at least one of the slots, the second spring means being interposed between the second stop of the one slot and the pin therein and circumferentially spaced closer to the second stop than the first stop.

BRIEF DESCRIPTION OF THE DRAWINGS

The supercharger and torsion damping mechanism of the present invention is shown in the accompanying drawings in which:

FIG. 2 is a partial, sectional view of the supercharger; and

DETAILED DESCRIPTION OF THE DRAWINGS

Figure 1:
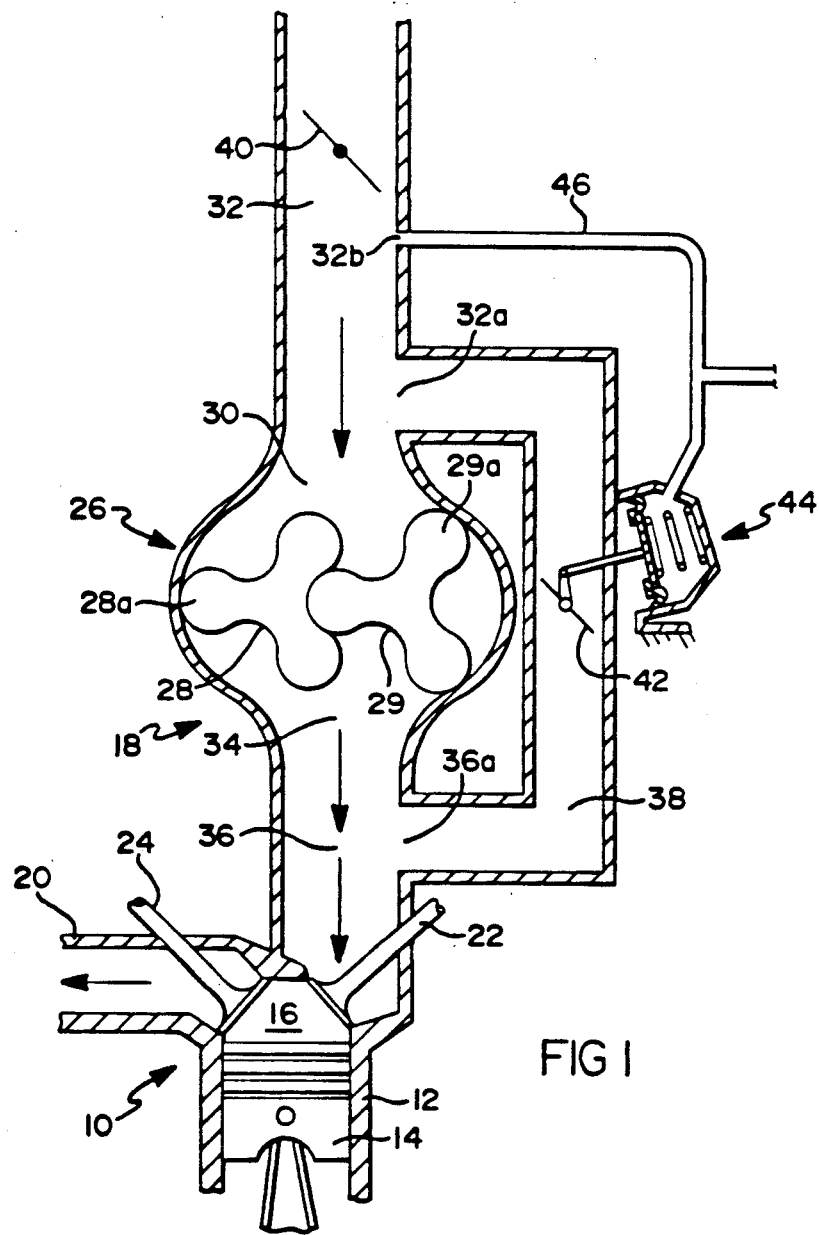
FIG. 1 schematically illustrates an intake manifold assembly having a positive displacement, backflow-type blower or supercharger therein for boosting pressure to an internal combustion engine.

Referring first to FIG. 1, therein is schematically illustrated a portion of an internal combustion engine 10 which is preferably of the periodic combustion type such as the Otto or Diesel cycle type. The engine includes a plurality of cylinders 12 and a reciprocating piston 14 disposed within each cylinder to define an expandable combustion chamber 16, the engine includes intake and exhaust manifold assemblies 18,20 for respectively directing combustion air to-and-from the combustion chambers via intake and exhaust valves 22,24.

The intake manifold assembly 18 includes a positive displacement blower 26 of the backflow or Roots-type having a pair of rotors 28,29 with meshed lobes 28a,29a. The rotors may be mechanically driven by engine crankshaft torque transmitted thereto in known manner via an unshown drive belt. The mechanical drive rotates the blower rotors at a fixed ratio relative to crankshaft speed and such that the blower displacement is greater than the engine displacement, thereby boosting or supercharging the air going to the engine combustion chambers to increase engine power.

The supercharger includes an inlet port 30 receiving an air or air-fuel mixture charge from an inlet duct or passage 32 and a discharge or outlet port 34 directing the charge to the intake valves 22 via a discharge duct or passage 36. The intake and discharge ducts are intercommunicated via a bypass duct or passage 38 connected at openings 32a,36a in the intake and discharge ducts 32,36, respectively. If the engine 10 is of the Otto cycle type, a throttle valve 40 preferably controls air or air-fuel mixture flow into intake duct 32 from a source, such as ambient or atmospheric air, in a well known manner.

Disposed within the bypass duct is a bypass valve 42 which is moved between open and closed positions by an actuator assembly 44 responsive to pressure in inlet duct 32 via a line 46 and therefore operative to control supercharging pressure in duct 36 as a function of engine power demand. When bypass valve 42 is in the fully open position, the air pressure in discharge duct 36 is relatively low or a minimum relative to the air pressure in intake duct 32. When the valve is fully closed, the air in the discharge duct is relatively high.

Figure 4:
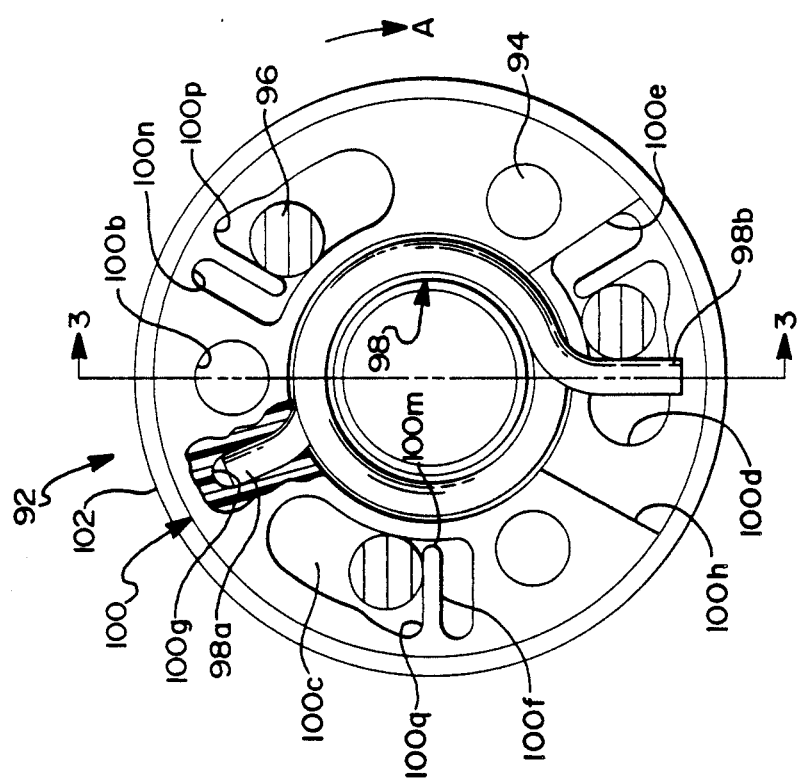
FIGS. 3 and 4 are detailed views of a torsion damping mechanism in FIG. 2.
Figure 3:
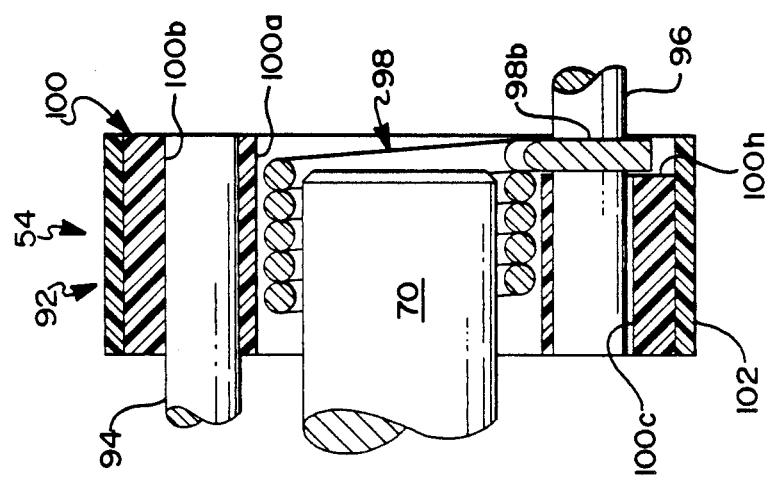

Looking now at FIGS. 2–4, therein is shown a portion of blower 26 in detail. The shown portion includes a housing assembly 48, a rotor assembly 50, an input drive assembly 52, and a torsion damping mechanism 54. Damper mechanism 54 is shown in relief in FIGS. 2 and 4 and in section in FIG. 3. The section of FIG. 3 is taken along line 3—3 of FIG. 4. The supercharger housing assembly includes a main housing section 56 and an input drive section 58 secured together by a plurality of bolts 60 and defining therebetween a gear chamber 62 which normally contains a lubricating oil. The main housing section 56 defines a rotor chamber 64 separated from the gear chamber by an end wall portion 56a having stepped through bores 56b,56c for supporting anti-friction bearings 66 and dynamic seals 68. Main housing section 56 also defines inlet and outlet ports 30,34 and a second unshown end wall portion for closing the left end of chamber 64 and supporting bearings similar to bearings 66.

The rotor assembly 50 includes the rotors 28,29, shafts 70,71 fixed to the rotors and supported at both ends by bearings such as bearing 66, and meshed timing gears 72,74 pressed on the right ends of shafts 70,71 and operative to prevent contact of meshing rotor lobes 28a,29a. Rotors 28,29, like housing assembly 48, are preferably formed of a light-weight material, such as aluminum alloy. The rotors may include any number of lobes; herein each rotor includes three lobes 28a,29a. The lobes may be straight, as shown in FIG. 1, or helical, as shown in FIG. 2. A more detailed description of the main housing section and rotor assembly may be found in U.S. Pat. No. 4,638,570 which is incorporated herein by reference.

Input drive assembly 52 includes a shaft 76 supported by anti-friction bearings 78 and axially aligned with the axis of shaft 70, a dynamic seal 80, a pulley 82 secured to shaft 76 by a key 84 and a nut 86, an annular end member 88 pressed on the left end of the shaft, and a spring 90 leftwardly biasing the leftwardly disposed bearing 78 against a shoulder 88a of end member 88 to prevent bearing flutter. Pulley 82 is driven by the previously mentioned and unshown belt which transmits engine torque.

During non-supercharging, low engine speed or idle speed operation the meshed teeth of the timing gears are substantially unloaded and have been known to bounce or clash back and forth against each other through the backlash therebetween. The bounce or clash produces an objectional noise known as gear rattle and is believed to be caused by torsionals in the supercharger drive torque provided by periodic combustion engines such as engine 10. The resilient drive provided by torsion damping assembly 54 reduces the rattle noise below the audible range.

Torsion damping mechanism 54 includes an annular means 92 disposed for rotation about the common axis of shafts 70,76, two sets of three axially extending pins 94,96, and a torsion spring 98. Annular means 92 includes an annular member 100 formed of a molded relatively soft or compliant elastomeric material, and an outer shell 102 banded about member 100 and formed of a relatively hard plastic or metal material. Annular member 100 includes a central opening 100a concentric to the common axis, three circumferentially spaced apart through bores 100b, three circumferentially spaced apart through slots 100c of generally arcuate shape interposed between the through bores, stops 100d,100e defining first and second ends of each slot and a cantilever spring 100f extending radially into each slot. Through bores 100b and slots 100c are radially spaced from the extend parallel to the common axis. Pins 94 are press fit at one end into bores 74a of gear 74 and are press fit at the other end into through bores 100b of the annular member. Pins 96 are press fit at one end into bores 88b of end member 88 and are slidably received at the other end by arcuate slots 100c. Pins 96 and slots 100c may be provided with an amount of radial free play therebetween to mitigate the effects of misalignment of shafts 70,76 and/or components therebetween. The first and second ends or stops 100d,100e limit relative rotation between input and output drives respectively defined by shaft 76 and gear 74. Torsion spring 98 provides a low torque transmitting, low rate resilient drive between pins 94,96 or the drives which attenuates or isolate torque fluctuations or torque spikes for preventing audible gear tooth rattle of timing gears 72,74 during non-supercharging, low engine speed modes of operation. Cantilever springs 100f collectively define a relatively high rate resilient shock absorber for preventing audible impacts of pins 96 against stops 100e due to high energy negative torque fluctuations or spikes which occur during engine shut-down, abrupt movement of the engine throttle, and/or rough engine operation at low engine speeds.

The elastomeric material of annular member is selected to withstand high frequency, high energy impacts of pins 98 against stops 100d. Hence, it is important to select an elastomer having low hysteresis, so that the material can respond to the impacts and absorb a series of high energy impacts occurring over a short period of time with minimum distortion and minimum audible noise. Acceptable performance has been obtained with materials, having a modulus of elasticity in the range of 10,000 to 40,000 psi over the normal operating range of the damping mechanism and a hardness in the range of 50 to 80 shore D durometer, preferably a range of 55 to 75. Best performance has been obtained with Hytrel TM polyester elastomers from E. I. Du Pont de Nemours and Company. Outer shell 102 constrains annular member 100 and is formed of a substantially higher strength and harder material such as metal or a hard thermoplastic. An example of such a hard thermoplastic is Victrex PEEK (polyether-etherketone) having a modulus of elasticity of about 500,000 psi and obtainable from ICI (Imperial Chemical Industries) Advanced Materials Business Group, Wilmington, Del. 19897, U.S.A.

Torsion spring 98 includes radially extending, opposite ends or tangs 98a,98b interconnected by a plurality of helically wound coils (herein about 3.5 coils) disposed in central opening 92a of the annular member. End 98a is retained in a blind bore 100g against movement relative to annular member 100 and timing gear 74. End 98b is disposed for circumferential movement in an axially open, arcuate recess 100h in an end face of annular member 100 and is positioned against one of pins 96 to resiliently transmit torque in the direction of arrow A in FIG. 4 from pin 96 to gear 74 via annular member 100 and pins 94. Herein, torque in the direction of arrow A is taken as positive and in the opposite direction as negative.

Cantilever springs 100f are preferably integrally formed of the molded elastomeric material of member 100; however, they may be formed of other materials; for example, spring steel molded into member 100 and/or attached to outer shell 102. The free ends 100m of the springs preferably extend radially into the slot to assist in maintaining concentrically between the pins and the annular member. Compliance of the springs may be increased by providing recesses 100n, 100p in the radially outer wall of each slot at positions circumferentially adjacent the fixed end 100g of each spring 100f, thereby increasing beam length of the spring while providing increased compliance of the material remaining between the recesses and the outer surface of the annular member.

As previously mentioned, the primary function of spring 98 is to prevent audible gear tooth rattle of timing gears 72,74 during non-supercharging, low engine speed modes of operation. To prevent gear tooth rattle in this mode of operation, the rate of spring 98 should be such that the natural frequency of the spring-mass system is less than one-quarter of the distributing frequency to provide acceptable isolation. By way of example only for the size supercharger disclosed herein, spring 98 has a rate of about one-third inch pound per degree of movement of end 98b relative to end 98a. The free length of a spring of such low rate would not have enough initial torque transmitting capacity to be operative in a reasonable relative rotation range such as provided by stops 100d, 100e. Accordingly, spring 98 is preloaded eight degrees to provide the spring with sufficient initial torque transmitting capacity. The preload positions pins 96 against springs 100f when the damping mechanism is in a non-torque transmitting or static state. Spring 98 also lessens the energy of impacts of the first or forward direction stops 100d and in combination with the soft material member 100 render such impacts inaudible.

In some engine supercharger installations and during engine shut-down, rough low speed engine operation and abrupt throttle movement, pins 96 can audibly impact second or reverse direction stops 100e even when the stops and member 100 are formed of relatively soft material. Audible impacts during engine shut-down can be particularly severe. Springs 100f, having a collective or combined rate an order of magnitude or more greater than spring 98, effectively mitigate such audible impacts.

A preferred embodiment of the invention has been disclosed herein for illustrative purposes. Many variations and modifications of the disclosed embodiment are believed to be within the spirit of the invention. The following claims are intended to cover inventive portions of the disclosed embodiment and variations and modifications believed to be within the spirit of the inventive portions.

What is claimed is:

1. A torsion damping mechanism adapted to be rotatably interposed between first drive means rotatably driven in one direction by torque from a periodic combustion engine and second drive means for driving a first gear in constant mesh with a second gear; the mechanism characterized by:

annular means disposed for rotation about an axis and fixed to one of the drive means, the annular means including a plurality of circumferentially spaced apart and generally arcuate-shaped slots each having first and second ends respectively defining stops in the one direction and in the opposite direction of rotation;

axially extending pins each having one end loosely received by one of the slots and the other end fixed to the other drive means;

a first spring means for drivingly interconnecting the other drive means and the annular means, and operative in a static state of the mechanism to position the pins closer to the second stops than to the first stops; and second spring means fixed at one end to the annular means and having a free end extending radially in cantilever fashion into at least one of the slots, said second spring means interposed between the second stop of the one slot and the pin therein and circumferentially spaced closer to the second stop than the first stop.

2. The mechanism of claim 1, wherein the free end of the second spring means extends radially inward.

3. The mechanism of claim 1, wherein the second spring means has a spring rate greater than the spring rate of the first spring means.

4. The mechanism of claim 1, wherein the first spring means is preloaded for biasing the pin in the one slot against second spring means during the static state.

5. The mechanism of claim 4, wherein the second spring means has a spring rate greater than the spring rate of the first spring means.

6. The mechanism of claim 5, wherein the free end of the second spring means extends radially inward.

7. The mechanism of claim 1, wherein the first spring means is a torsion spring having a plurality of helically wound coils disposed in a central opening of the annular means.

8. The mechanism of claim 2, wherein the annular means includes recessed portions or circumferentially adjacent sides of the fixed ends of the second spring means for increasing compliance of the second spring means.

9. The mechanism of claim 1, wherein the annular means includes an annular member defining the slots, the annular member and the second spring means being integrally formed of a molded elastomeric material.

10. The mechanism of claim 9, wherein the annular means includes an outer shell banded about the annular member and formed of rigid material relative to the annular member.

11. The mechanism of claim 9, wherein the elastomeric material has a hardness in the range of 50–80 shore D durometer.

12. The mechanism of claim 9, wherein the elastomeric material has a hardness in the range of 55 to 75 shore D durometer.

13. The mechanism of claim 9, wherein the free end of the second spring means extends radially inward.

14. The mechanism of claim 9, wherein the second spring means has a spring rate greater than the spring rate of the first spring means.

15. The mechanism of claim 14, wherein the first spring means has a torque transmitting capacity less than one quarter of the normal full torque transmitting capacity of the gears and has a relatively low spring rate for reducing gear tooth rattle of the gears.

16. A rotary blower of the backflow-type comprising a housing; first and second meshed lobed rotors rotatably disposed in the housing for transferring relatively low pressure inlet port air to outlet port air controllable between relatively low and high pressures; first and second meshed timing gears respectively fixed to the first and second rotors for preventing contact of the meshed lobes; first drive means adapted to be rotatably driven by a positive torque about an axis in one drive direction at speeds proportional to speeds of a periodic combustion, torque transmitting engine selectively controllable between idle and maximum speeds; and a second drive means fixed to one of the timing gears; characterized by:

a torsion damping mechanism rotatably disposed between the input drive and the first timing gear, said damping mechanism including:

annular means disposed for rotation about an axis and fixed to one of the drive means, the annular means including a plurality of circumferentially spaced apart and generally arcuate-shaped slots each having first and second ends respectively defining stops in the one direction and in the opposite direction of rotation;

an axially extending pin having one end loosely received by each of the slots and the other end fixed to the other drive means;

a first spring means for drivingly interconnecting the other drive means and the annular means, and operative in a static state of the mechanism to position the pins closer to the second stops than to the first stops; and second spring means fixed at one end to the annular means and having a free end extending radially in cantilever fashion into at least one of the slots, said second spring means interposed between the second stop of the one slot and the pin therein and circumferentially spaced closer to the second stop than the first stop.

17. The mechanism of claim 16, wherein the free end of the second spring means extends radially inward.

18. The mechanism of claim 16, wherein the second spring means has a spring rate greater than the spring rate of the first spring means.

19. The mechanism of claim 16, wherein the first spring means is preloaded for biasing the pin in the one slot against second spring means during the static state.

20. The mechanism of claim 19, wherein the second spring means has a spring rate greater than the spring rate of the first spring means.

21. The mechanism of claim 20, wherein the free end of the second spring means extends radially inward.

22. The mechanism of claim 16, wherein the first spring means is a torsion spring having a plurality of helically wound coils disposed in a central opening of the annular means.

23. The mechanism of claim 22, wherein the annular means includes recessed portions or circumferentially adjacent sides of the fixed ends of the second spring means for increasing compliance of the second spring means.

24. The mechanism of claim 16, wherein the annular means includes an annular member defining the slots, the annular member and the second spring means being integrally formed of a molded elastomeric material.

25. The mechanism of claim 24, wherein the annular means includes an outer shell banded about the annular member and formed of rigid material relative to the annular member.

26. The mechanism of claim 24, wherein the elastomeric material has a hardness in the range of 50-80 shore D durometer.

27. The mechanism of claim 24, wherein the elastomeric material has a hardness in the range of 55 to 75 shore D durometer.

28. The mechanism of claim 24, wherein the free end of the second spring means extends radially inward.

29. The mechanism of claim 24, wherein the second spring means has a spring rate greater than the spring rate of the first spring means.

30. The mechanism of claim 29, wherein the first spring means has a torque transmitting capacity less than one quarter of the normal full torque transmitting capacity of the gears and has a relatively low spring rate for reducing gear tooth rattle of the gears.

* * * * *